United States Patent
Oppenheimer

(10) Patent No.: US 7,180,034 B1
(45) Date of Patent: Feb. 20, 2007

(54) METHOD AND APPARATUS TO COOK AND FORM AN OMELET IN ONE STEP

(76) Inventor: Jerry Oppenheimer, 10546 Glory Meadow Ct., Charlotte, NC (US) 28278

( * ) Notice: Subject to any disclaimer, the term of this patent is extended or adjusted under 35 U.S.C. 154(b) by 45 days.

(21) Appl. No.: 11/270,031

(22) Filed: Nov. 9, 2005

(51) Int. Cl.
*A47J 37/00* (2006.01)
*A47J 37/06* (2006.01)

(52) U.S. Cl. .................... 219/386; 219/524; 99/372

(58) Field of Classification Search .............. None
See application file for complete search history.

(56) References Cited

U.S. PATENT DOCUMENTS

| | | | | |
|---|---|---|---|---|
| 2,116,688 | A | * 5/1938 | Ratliff | 99/374 |
| 4,773,318 | A | 9/1988 | Furletti | |
| 4,803,918 | A | * 2/1989 | Carbon et al. | 219/524 |
| 5,636,564 | A | * 6/1997 | Weiss | 219/524 |
| 5,642,659 | A | 7/1997 | Sesona et al. | |
| 5,768,994 | A | * 6/1998 | Bobo | 99/374 |
| 5,937,742 | A | * 8/1999 | Steeb et al. | 99/376 |
| D465,965 | S | * 11/2002 | Dalton et al. | D7/352 |
| 6,595,114 | B1 | 7/2003 | Endres et al. | |
| 7,021,199 | B2 | * 4/2006 | Lubowicki et al. | 99/372 |
| 2005/0039737 | A1 | * 2/2005 | Haber | 99/372 |

* cited by examiner

Primary Examiner—Joseph Pelham

(57) ABSTRACT

The electrically powered omelet former and cooker has a base defining the cookers footprint and supporting a clamshell type cooking apparatus having two cooking halves that are independently pivotable vertically, and together are horizontally and vertically pivotable, within the footprint of the base. Each half having a hot plate and a heating element for heating the hot plate to the desired temperature. The lower half provides one or more vessel type recesses to accept the mixture to be cooked while the top half has a corresponding set of raised convex chamber caps each designed to nest with the other creating a form and cooking chamber. When in use the cooking unit is initially opened with the two halves at ninety degree angles from each other with the lower half resting on the base, the chamber vessels facing upward to be filled. The egg mixture is poured into the vessel chamber/s and then any ingredients of the omelet are added. Once all ingredients have been added and gravity has drawn them down to be surrounded by the loose egg mixture the top half is closed and latched forming the cooking chamber and preventing the halves from separating. The mixture is now being cooked from all sides while expanding in the chamber creating a light fluffy omelet, perfectly formed, with the added ingredients completely contained within the cooked egg. To serve the finished omelet, the halves are pivoted vertically slightly and rotated horizontally 180 degrees to its inverted ending position. The latch is released and the lower half is raised releasing the cooked and formed omelet from the forming vessel and leaving the finished omelet resting on the chamber cap where it is removed with tongs or a spatula and served. The unit is closed and returned to its starting position to create another omelet.

10 Claims, 3 Drawing Sheets

METHOD AND APPARATUS TO COOK AND FORM AN OMELET IN ONE STEP

CROSS REFERENCE TO RELATED APPLICATIONS

Not applicable.

FEDERALLY SPONSORED RESEARCH

Not applicable.

SEQUENCE LISTING OR PROGRAM

Not applicable.

BACKGROUND OF THE INVENTION

1. Field of Invention

The present invention relates to electrical cooking appliances and specifically to an electrical appliance that forms and quickly cooks an egg mixture into an omelet, completely containing any added ingredients within the cooked egg, creating a neat well formed easy to serve omelet in on step.

2. Discussion of Prior Art

Omelets are meant to be a scrambled egg mixture that is cooked to be fluffy with any number of ingredients added and contained in the center of the cooked egg. Omelets are traditionally cooked on a griddle or in a pan and include any number of added ingredients, i.e. onions bacon, cheese etc. meant to be contained within the center of the cooked egg. These ingredients were cooked into the thin egg mixture and then folded or rolled to contain the ingredients within the cooked egg. This action of folding over or rolling would cause the egg to tear and the ingredients to fall out and become separated from the cooked egg, leaving an omelet that was messy, difficult to serve and not appetizing to look at.

Prior art includes U.S. Pat. No. 4,773,318 an omelet pan. This design addressed the forming of the omelet. It solved the problem of easily folding the omelet. It does not however solve the problem of tearing the egg or containing the ingredients. The pan was shallow leaving the ingredients not totally incorporated in the cooked egg. This design was also made to be used on a stove, meaning it was not self contained and could not operate outside of the kitchen.

Other prior art includes a pancake and egg cooker, U.S. Pat. No. 5,642,659. This design also requires an out side heat source such as a griddle or stove, and therefore is not self contained and has limits. This design, also cooks its batter in a circular shape which means the cooked egg must still be folded over to form and contain the added ingredients. The problem of tearing and ingredients falling out is still present In this design the cooking dish is shallow and covered by a flat plate. The flat plate used to cover, flip and cook the other side does not allow for the expansion of the egg as it cooks and thereby renders a hard, rubbery texture to the cooked omelet. Also as a result of the shallow dish the ingredients are not able to be surrounded by the loose egg and when it is covered to cook the other side the added ingredients will foul the cover plate. This design also is only capable of cooking one meal at a time. Overall it does not address the issues that exist when cooking an omelet.

More recent prior art includes a clamshell type cooking device, U.S. Pat. No. 6,595,114 B1. This design also cooks the egg mixture in a circular shape. By cooking it in this shape it must still be folded to form the omelet. As discussed earlier this may tear the cooked egg and cause the ingredients to fall loose from the omelet. The cooking plates are not designed to allow ingredients to be surrounded by the egg mixture. The top heating surface is designed to contact the batter to cook it. This surface would become fouled if cheese were an ingredient of the omelet. Also the top cooking surface does not allow the egg to expand as it cooks and thereby the egg loses it's fluffy quality and is rendered hard and rubbery similar to the texture of a pancake. The hard rubbery texture also exacerbates the issue of tearing when the cooked egg is folded to form the omelet Cleaning the plates has not been addressed and could be difficult. Also in solving the problem of flipping it has created a new problem of space. When filling the vessel with batter, or flipping, the appliance requires counter space twice the size of its resting footprint.

3. Objects and Advantages

Accordingly, several objects and advantages of the invention are:

(a) To provide an appliance that forms and cooks an omelet in one step. No need to fold or roll.

(b) To provide an appliance that will form and cook the omelet so all ingredients will be contained within the cooked egg.

(c) To provide an appliance that will form and cook an omelet and maintain it's fluffy texture.

(d) To provide an appliance that will allow the forming and cooking of 1 or more omelets with different ingredients at the same time.

(e) To provide an appliance that will allow the egg mixture to rise around added ingredients as it cooks to contain ingredients within the cooked egg mixture.

(f) To provide an appliance that will be easily cleaned and maintained.

(g) To provide an appliance that can be utilized in a minimum of table or counter space.

(h) To provide an appliance that can be utilized by anyone with electrical power.

(i) To provide an appliance that is simple and easy to use.

(j) To provide an appliance that allows the plates to be removed to be washed in the dishwasher or to interchange for plates with different or decorative shapes.

(k) To provide an appliance that is inexpensive to manufacture and affordable to the consumer.

Further objects and advantages will become apparent from a consideration of the ensuing description and drawings.

SUMMARY

In accordance with the present invention an electrically powered apparatus that forms and cooks an egg mixture into an omelet in one step and comprises an apparatus having two cooking halves each with a hot plate and a heating element. Said plates together form a cooking chamber that forms and cooks an egg mixture allowing the egg to expand and cook around the added ingredients to create a well formed fluffy neat easy to serve omelet.

DRAWINGS—FIGURES

Figure 1:
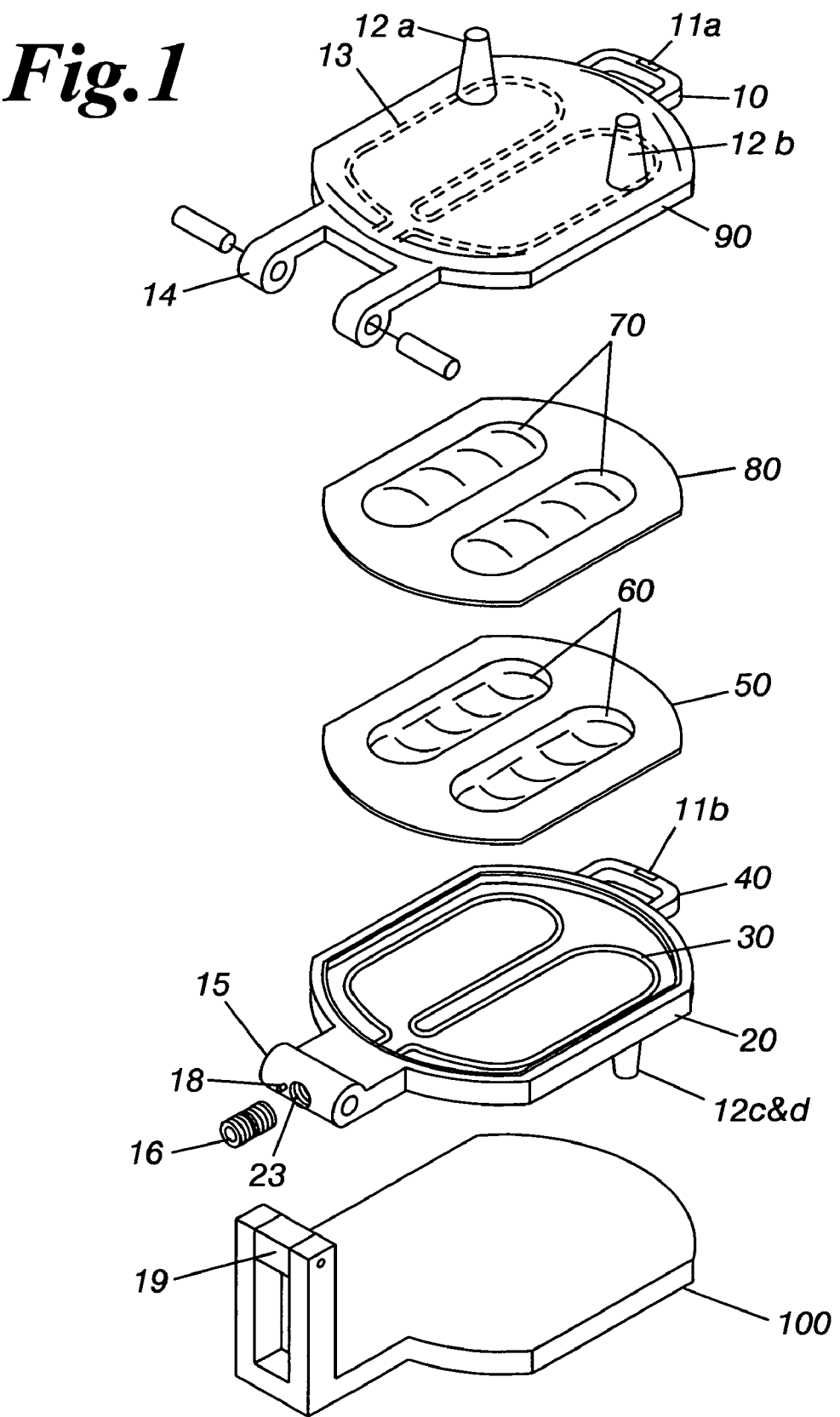
FIG. 1 is an exploded view of the electric omelet maker.
Figure 2:
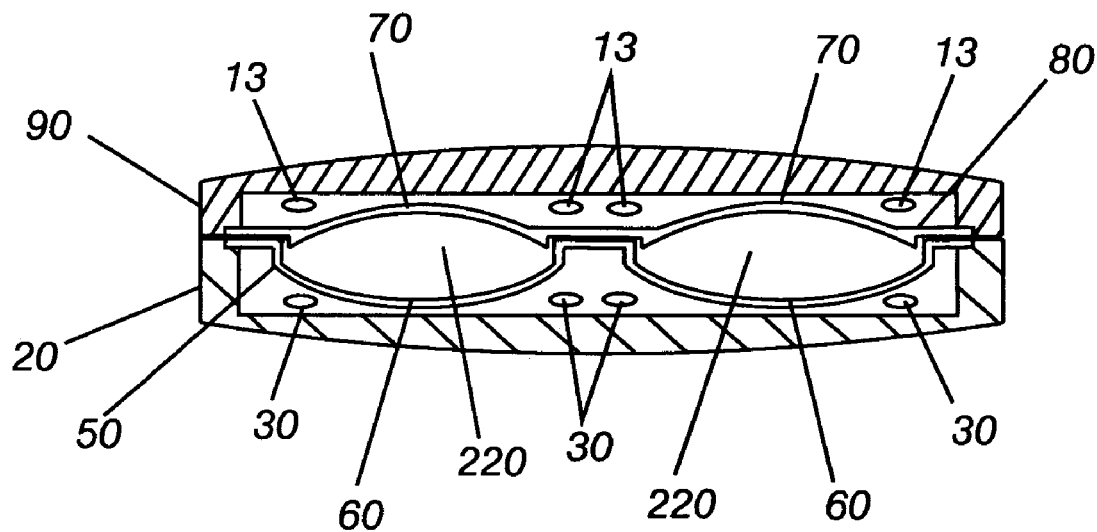
FIG. 2 is a cross section of the omelet maker depicting the top and bottom housing closed to form the cooking chambers.

| DRAWINGS--Reference Numerals | |
|---|---|
| 20 lower housing | 90 upper housing |
| 30 heating element | 13 heating element |
| 40 housing handle | 10 housing handle |
| 15 Lower housing hinge | 14 housing hinge |
| 16 rotating conduit | 11a locking latch |
| 18 rotation limit pin | 11b latch receiver |
| 21 rotation limit slot | 12a&b housing feet |
| 22 means of mounting | 80 chamber cap plate |
| 23 means of mounting | 70 chamber cap |
| 50 vessel plate | 19 vertical pivot |
| 60 forming vessel | 100 base |
| 12c&d housing feet | 220 cooking chamber |

DETAILED DESCRIPTION—PREFERRED EMBODIMENT—FIGS. 1, 2, 3, and 5

Figure 3:
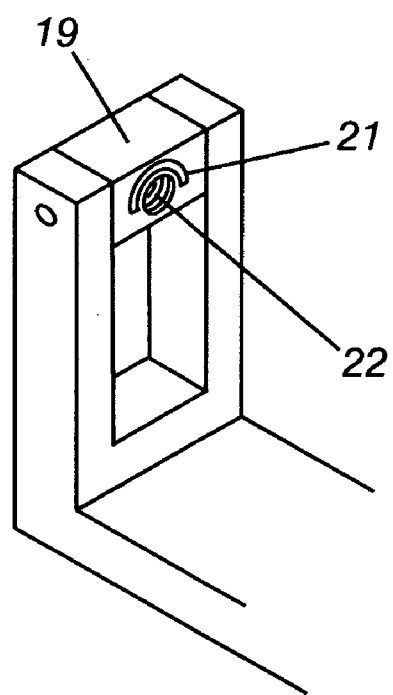
FIG. 3 is a cut away of the base where the two housings attach to the base and rotate showing the rotation limit groove and pin.

FIG. 1 depicts an exploded view of my electric omelet cooker. The electric cooker has a base 100 which supports a vertical pivot 19. In FIG. 3 the support is shown as a cut away looking at the front of the vertical pivot 19 showing a means of mounting 22 and a rotation limit slot 21.

Attached to the vertical pivot 19 by the means of mounting 22 is a rotating conduit 16. The rotating conduit 16 attaches to a lower housing 20 by a means of mounting 23 allowing a rotation limit pin 18 to fit inside the rotation limit slot 21. A heating element 30 sits inside the lower housing 20 and a vessel plate 50 which comprises forming vessels 60 rests atop the heating element 30 in a way that the heating element 30 surrounds the forming vessels 60. The forming vessels 60 are of a predetermined size and disposed to allow expansion a cooking food product. Attached to the outside of the lower housing 20 are a pair of housing feet 12c&d and housing handle 40 comprising a locking latch receiver 11b.

In an upper housing 90 rests a heating element 13, a chamber cap plate 80, which comprises chamber caps 70 adapted to mirror forming vessels 60 of the vessel plate 50. The chamber caps 70 rise above the plane of the chamber cap plate 80 a sufficient height to allow them to nest in the forming vessels 60 and are concave to complete the form of the cooking chamber 220 as depicted in the FIG. 2 cross-section. Attached to the outside of the upper housing 90 is a housing handle 10 a locking latch 11a a housing hinge 14 and a pair of housing feet 12a&b.

Figure 5:
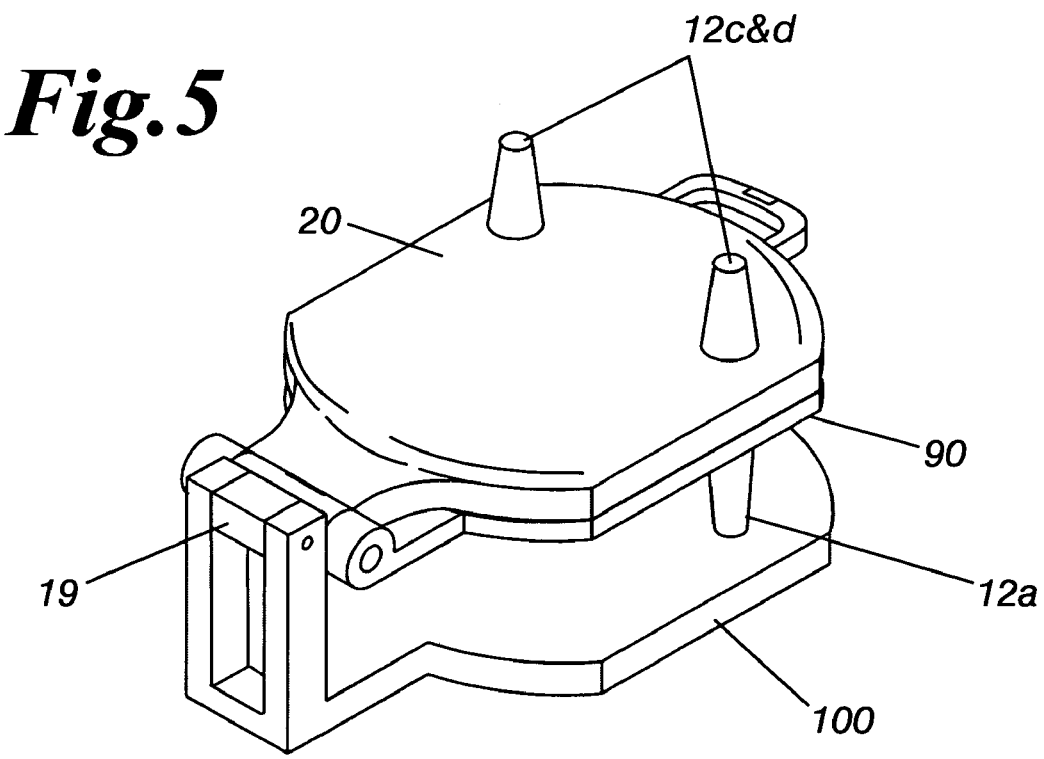
FIG. 5 shows the unit in its inverted ending position prior to opening to release the finished omelet from the forming vessel to rest on the chamber cap for removal.

The upper housing 90 is attached to the lower housing 20 at the housing hinge 15 and the housing hinge 14. FIG. 5 shows the completed unit as it is configured just prior to removing the cooked omelet.

OPERATION—PREFERRED EMBODIMENT—FIGS. 1, 4,5

The method of using the omelet maker is as follows and refers to the FIGS. 1, 4, and 5. The electric omelet maker is very simple and similar to the use of other counter-top electric devices such as waffle irons or grills. My electric omelet maker will use standard household electricity and be plugged into an available electric outlet.

From a resting position of the base 100 resting on a counter and the housing feet 12c&d resting on the base 100 the unit is turned on and pre heated. Once pre-heated the upper housing 90 is raised to rest on the vertical pivot 19. This allows access to the pre-heated forming vessels 60 for filling. A scrambled egg mixture, of a pre determined amount is poured into the pre-heated forming vessels 60. As the egg mixture contacts the pre heated forming vessel 60 it forms an outer skin of cooked egg. This is the time the ingredients are added, while most of the egg mixture in the forming vessels 60 is still loose. Gravity will draw the added ingredients into the egg mixture but keep them contained within the skin of cooked egg that has already formed at the bottom. At this time the upper housing 90 is closed and the locking latch 11a is connected to the latch receiver 11b locking the unit together. The chamber caps 70 and the forming vessels 60 are nested and form the cooking chamber 220. The egg mixture is now cooking from all sides and expanding as it cooks, the ingredients remaining within the center of the egg. When cooking is complete we prepare to remove the omelet for serving.

Figure 4:
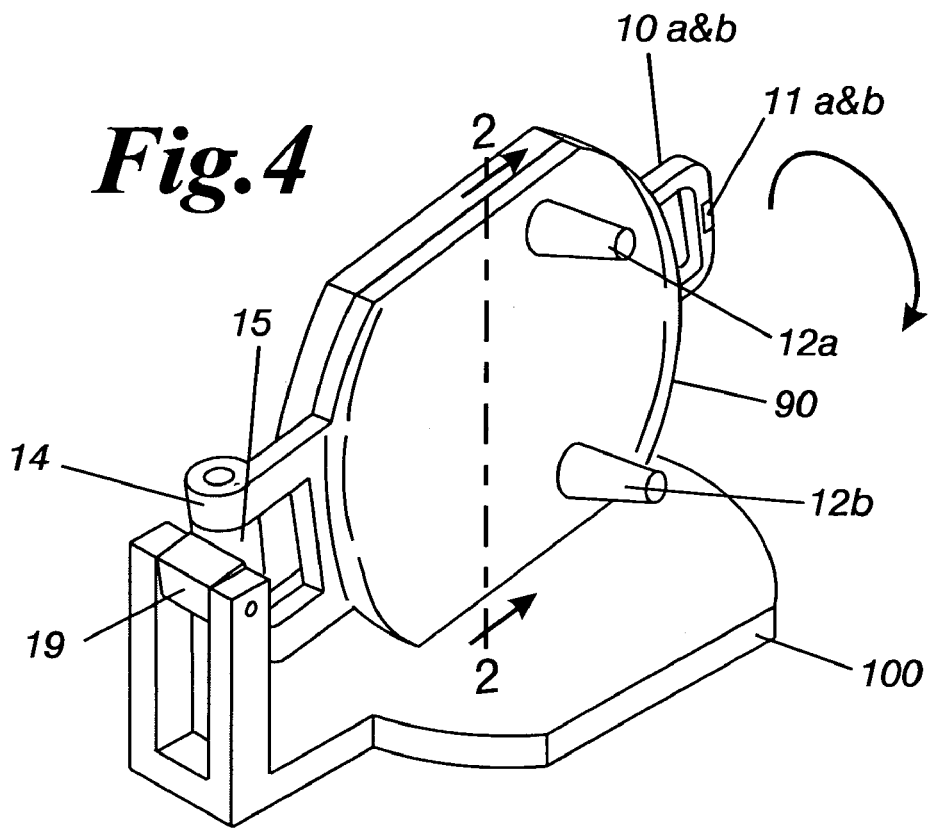
FIG. 4 shows the working unit as it is pivoted up and rotated horizontally to allow the release of the finished omelet from the forming vessel for serving.

FIG. 4 depicts the configuration as the cooker is pivoted and rotated to invert the housings and release the omelet. By grasping the locked housing handles 11a&b the unit may be raised vertically a sufficient distance to allow the unit to rotate horizontally 180 degrees. The upper housing 90 is now on the bottom and the upper housing feet 12a&b are resting on the base 100. This is the inverted ending position, the shallow chamber caps 70 are on the bottom of the unit facing upward and the forming vessels 60 are on the top of the unit facing downward. The locking latch 11a is unlatched from the latch receiver 11b and the lower housing 20 is raised to rest on the vertical pivot 19. Gravity allows cooked omelet to slip from the forming vessel 60 and is left sitting on the chamber cap 70 where it can be removed easily with tongs or a spatula and served. The unit is then closed and rotated 180 degrees back to its starting configuration.

CONCLUSION, RAMIFICATIONS, AND SCOPE

Accordingly the reader will see that, the electric omelet cooker, provides a simple and very effective means of forming and cooking an omelet. The electric omelet cooker forms and cooks the omelet in one step, in a minimum of space it maintains the fluffy texture of the omelet and contains the added ingredients in the center of the cooked egg in one step. The omelet maker is compact and uses its counter space very efficiently disposing it to be utilized outside a formal kitchen. The electric omelet maker has many additional advantages in that

- The omelet cooker provides for cooking an omelet outside of a formal kitchen, such as in a dorm room or an office.
- The omelet cooker provides for the added ingredients to be surrounded by the egg mixture prior to cooking.
- No need to fold or manipulate the cooked egg after cooking so there is no need for additional utensils
- No manipulating means there is no tearing leaving an neat appetizing easy to serve meal.
- The omelet cooker provides for the expansion of the egg allowing for a soft fluffy omelet.
- It provides the ability to cook omelets with different ingredients simultaneously.

The omelet cooker is simple and easy to use by people of almost any age

The removable plates make the cooker easy to clean and maintain.

While the above description contains many specificities, these should not be construed as limitations on the scope of the invention, but as exemplifications of the presently preferred embodiments thereof. Many other ramifications and variations are possible within the teachings of the invention. For example the cooker could provide for decorative or specialty forms for the omelet. The cooker could be made larger or adapted for commercial use. The cooker may be adapted to be powered by a battery or some other power source. The cooker could be used to cook dishes that are traditionally baked such as apple pancakes, or Dutch baby panckes or the like.

Thus the scope of the invention should be determined by the appended claims and their legal equivalents, and not by the examples given.

The invention claimed is:

1. An electrically powered food product cooker comprises, a base adapted to rest on a supporting surface and providing a footprint of the cooker, upper and lower housings each having a hot plate disposed to be removable, and an internal heating element in proximity of the hot plate to facilitate transfer of heat from said heating element to said hot plate, and an electrical conductor attached to each of said heating elements to provide electricity to power said heating elements, said hot plate of the lower housing having an elongated recess of a pre determined size and depth disposed to allow for expansion of a cooking food product, said hot plate of the upper housing having an area the same shape as said recess raised slightly above the plane of the hot plate concave in nature and of a size that allows it to nest slightly within the recess, said housings being interconnected to allow for selective vertical pivoting between a first closed position, said housings resting atop one another with the hot plates nested together forming a cooking chamber, and a second open position with the housings separated by about ninety degrees and one hot plate facing upwards and one hot plate facing forwards, said lower housing being pivotally connected to said base to provide for selectively positioning between a first starting position, said housings closed, the lower housing resting directly atop the base and the upper housing resting atop said lower housing, and a second ending position, said housings closed and inverted, the upper housing resting directly on the base, and the lower housing is resting atop said upper housing.

2. The electrically powered cooker as claimed in 1, wherein said upper and lower housings each having a handle projecting forward with respect to the pivotal and rotational axes and are adapted to form one handle when in either of said closed positions, and both the housings have a support attached to keep said housings in a level condition with relation to the base.

3. The electrically powered cooker as claimed in 1, wherein the hot plate of the lower housing comprises a plurality of said recesses and the hot plate of the upper housing comprises a mirror image of said raised areas forming a plurality of the cooking chambers.

4. The electrically powered cooker as claimed in 1, wherein a means of pivoting is supported by the base and comprises a means of limiting rotation and a means of supporting a rotating conduit.

5. The electrically powered cooker as claimed in 4, wherein the upper and lower housings are connected to the means of pivoting with a rotating conduit connected to said lower housing.

6. An electrically powered cooker for food products comprising: a base adapted to rest on a supporting surface; upper and lower cooking halves each having a hot plate, said halves being interconnected by a first means providing said halves to selectively pivot vertically between a first closed position in which the halves are nested atop one another and a second open position in which said halves are separate from their nested position with one of said halves resting directly on the base with said hot plate facing upward and the other of said halves is resting perpendicular with its hot plate facing forward, said interconnected halves are supported on the base by a second means providing for selective pivotal movement of both of said halves within the footprint of the base when in the first closed position, providing for said halves to rotate between a first starting position, said halves in the closed position with said upper half above said lower half, and a second ending position, said halves in the closed position and inverted said lower half is above said upper half resting directly centered on the base, each of said halves having a heating element in heat transfer relationship with said hot plate of the half; and an electrical conductor electrically connected with each of said heating elements for supplying power to said elements.

7. An electrically powered cooker as claimed in claim 6, said cooking halves each having a handle projecting from the center with respect to the pivotal and rotational axis' the two handle halves being disposed to form one handle when in said closed position, attached to each of said halves a means to support disposed to engage a supporting surface.

8. An electrically powered cooker as claimed in claim 6, the hot plate of one of the halves having an oblong vessel type recess, the hot plate of other of said halves having an oblong region slightly raised above the plane of the hot plate and disposed to nest with said oblong vessel type recess when said cooking halves are in the closed position.

9. An electrically powered cooker as claimed in claim 8, said oblong vessel type recess being of a predetermined size and disposed to allow a cooking food product room to expand.

10. An electrically powered cooker as claimed in claim 8, said one cooking half having a plurality of said oblong vessel type recesses, said other cooking half having a matching plurality of oblong regions.

* * * * *